Feb. 14, 1933.       R. W. SNYDER       1,897,961
METHOD OF AND MACHINE FOR TREATING RUBBER COMPOUND
Filed Aug. 1, 1929       3 Sheets-Sheet 1

Inventor
Robert W. Snyder
By
Attorney

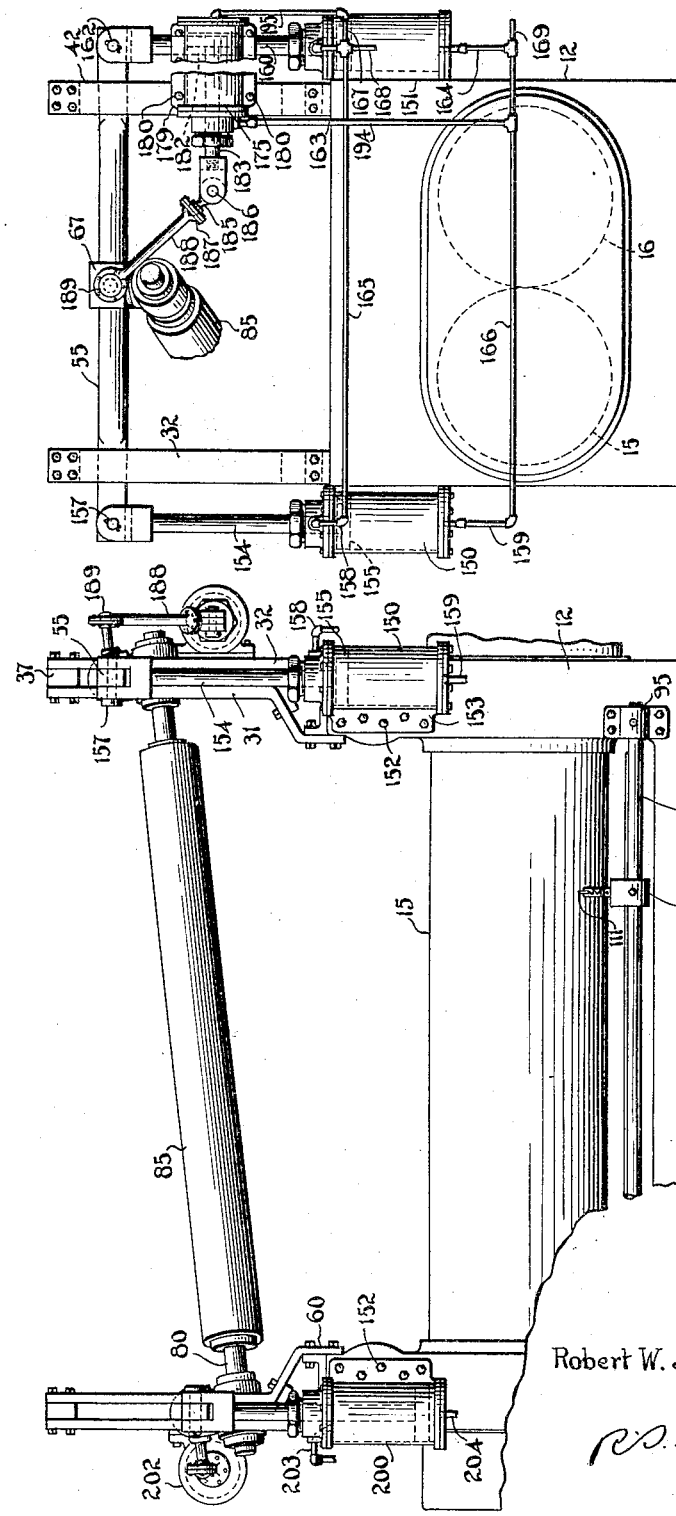

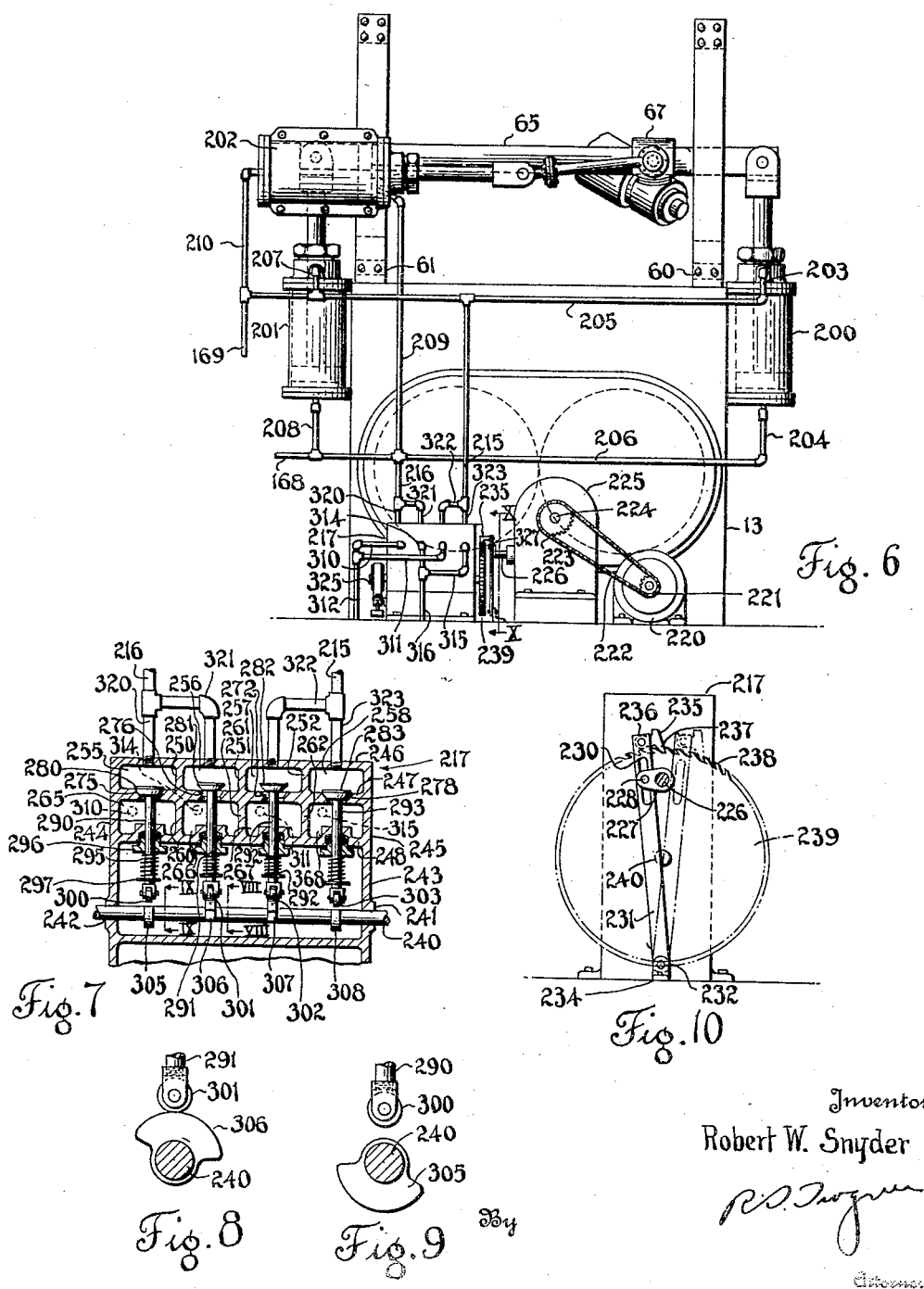

Patented Feb. 14, 1933

1,897,961

UNITED STATES PATENT OFFICE

ROBERT W. SNYDER, OF AKRON, OHIO, ASSIGNOR TO WINGFOOT CORPORATION, OF WILMINGTON, DELAWARE, A CORPORATION OF DELAWARE

METHOD OF AND MACHINE FOR TREATING RUBBER COMPOUND

Application filed August 1, 1929. Serial No. 382,609.

This invention relates to machines for treating rubber in its uncured state and it has particular relation to an apparatus and method employed in conjunction with such machines for advancing the rubber treating process.

An object of the invention is to provide an apparatus of the above designated character which is so constructed that rubber drawn between the rollers of a rubber treating machine is automatically conducted longitudinally of the cylindrical surfaces of the rollers.

Another object of the invention is to provide a method for treating rubber in which the rubber is introduced between a pair of cylindrical rollers adjacent one end thereof, thereafter automatically conducted longitudinally of the surfaces of the rollers and finally removed from such surfaces in continuous strip form.

Another object of the invention is to provide an apparatus of the above designated character in which rubber being treated between the milling rollers of a rubber treating machine, is automatically and periodically transferred longitudinally of the rollers, first in one direction and then in the other direction.

Usually raw or green rubber is mixed with certain compounding ingredients by means of milling rollers and is temporarily stored until such time when it is to be used in the manufacture of rubberized fabric and other products having a rubber constituent. Thereafter, the rubber compound is transported to a machine adapted for warming the rubber in order that it may be of suitable texture for subsequent treating operations. This machine comprises a pair of rollers having substantially contacting cylindrical surfaces, which are driven in opposite directions in such manner that their upper surfaces move toward each other. The rubber is disposed in the trough formed between the upper cylindrical surfaces of the rollers and, owing to the fact that the latter rotate in the directions previously referred to, the rubber is drawn downwardly between them. After the rubber begins to project beneath the lower surfaces of the rollers, it is directed by an operator around one or the other of the rollers and again into the trough formed between their upper cylindrical surfaces. This movement of the rubber continues by reason of the adhesion of one particle of rubber to another. After the rubber has been milled until it becomes warmed and of such texture that it is suitable for manufacturing purposes, it is removed by an operator who manually severs a strip from the roller and simultaneously rolls it into convolute form. Thereafter, the roll is transported to a calendering machine through which rubber and fabric are simultaneously passed and the fabric thereby impregnated with the rubber.

This invention provides an apparatus for automatically transferring the rubber introduced into the trough between the upper portions of the cylindrical surfaces of the rollers, longitudinally of such surfaces. The rubber is disposed in the trough at one end of the rollers and thereafter automatically moved toward the other end of the latter. As it reaches the last mentioned ends of the rollers, it is conducted therefrom in strip form directly to a calendering machine for use in impregnating fabric. According to one embodiment of the invention, an auxiliary roller is disposed above one of the milling rollers in such position that its axis is inclined relative to the axes of the latter. A strip of rubber cut from one of the milling rollers by knives adapted for that purpose, is conducted over the auxiliary roller and owing to the inclination of the latter, the strip is deflected axially into the trough at a point spaced longitudinally with respect to that portion of the roller from which the strip was removed. Thereafter, the rubber is severed by other knives and conducted in continuous strip form to a calendering machine by means of a conveyor adapted for that purpose.

Also the invention contemplates employing the apparatus described in the immediately preceding paragraph for automatically mixing raw rubber and compounding ingredients therefor or for treating rubber already compounded with such ingredients. For obtaining this result, the auxiliary roller referred to is connected at its ends to fluid operated devices by means of which the roller may be quickly shifted from one position inclined with respect to the milling rollers, to a position in which it is oppositely inclined with respect to such rollers. The fluid under pressure supplied to these fluid operated devices is controlled by means of an automatic valve timing mechanism which is so constructed that at predetermined intervals the auxiliary roller is alternately shifted from one of the above mentioned positions to the other. Hence, after rubber is disposed between the milling rollers and a strip thereof looped about the auxiliary roller, the rubber will be transferred from one end of the rollers to the other for a predetermined interval of time and then, owing to the shifting of the position of the auxiliary roller, the rubber will be transferred from the other end of the roller to the first mentioned end. This cycle of operation may be repeated until the rubber and compounding ingredients are thoroughly mixed or the previously compounded rubber is desirably treated, and then the strip may be removed by means of a conveying apparatus such as that previously described.

For a better understanding of the invention, reference may now be had to the accompanying drawings, forming a part of the specification, in which:

Fig. 4 is a front elevational view of a machine similar to that shown by Fig. 1, which varies from the latter figure in that fluid operated means are provided for adjusting one of the rollers comprising part of the machine;

Fig. 5 is a view of the machine shown by Fig. 4 taken from the right end thereof;

Fig. 6 is a view of the machine shown by Fig. 4 taken from the left end thereof;

Fig. 7 is a fragmentary cross-sectional view of a valve mechanism employed for automatically controlling the apparatus shown by Fig. 4;

Fig. 8 is a fragmentary cross-sectional view of the valve mechanism taken substantially along the line VIII—VIII of Fig. 7, illustrating the relative positions of a valve stem and a cam for operating it when the valve is open;

Fig. 9 is a view similar to that shown by Fig. 8 but taken substantially along the line IX—IX of Fig. 7, illustrating the relative positions of a cam and valve stem when the valve is closed; and Fig. 10 is a cross-sectional view, on a larger scale, taken substantially along the line X—X of Fig. 6, showing a part of the power means employed for operating the valve shown by Fig. 7.

Figure 1:
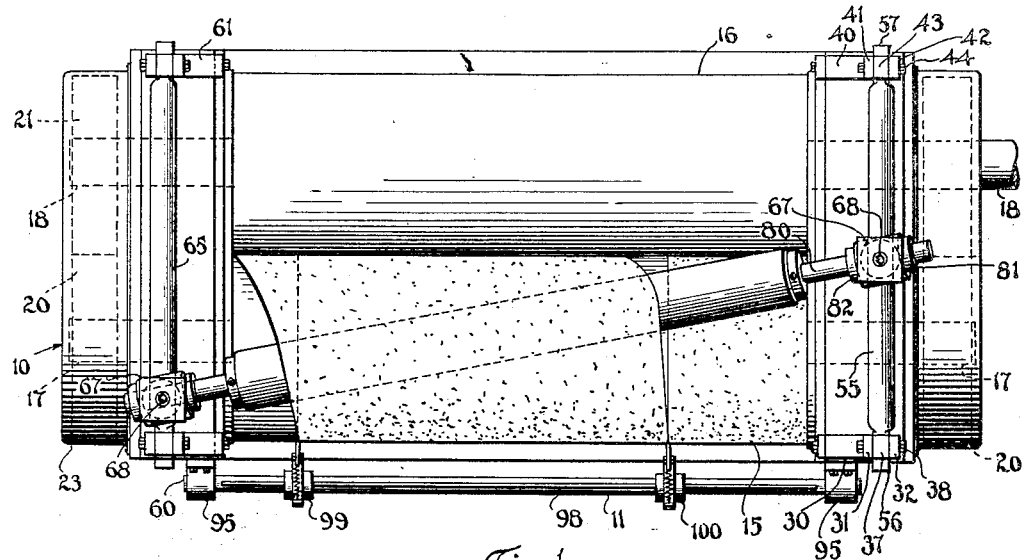
Fig. 1 is a plan view of a rubber treating machine which embodies one form of the invention.

Referring to the figures, a rubber treating machine 10 comprises a base 11 and vertically projecting end plates 12 and 13. A pair of rollers 15 and 16 are provided respectively with shafts 17 and 18 having their ends journaled in the end plates 12 and 13. The shafts 17 and 18 extend beyond the end plates and are provided respectively with intermeshing gears 20 and 21, encased in housings 22 and 23 secured to the end surfaces of the plates 12 and 13 respectively. The shaft 18 is connected by any suitable means to a driving motor (not shown). It follows that rotation of the shaft 18 results in rotation of the roller 16, and owing to the gears 20 and 21 interconnecting the shafts 17 and 18, the shaft 17 and roller 15 are rotated in a direction opposite to that of the roller 16 and shaft 18. The rotation of the rollers 15 and 16 is such that their upper cylindrical surfaces move toward each other.

Figure 2:
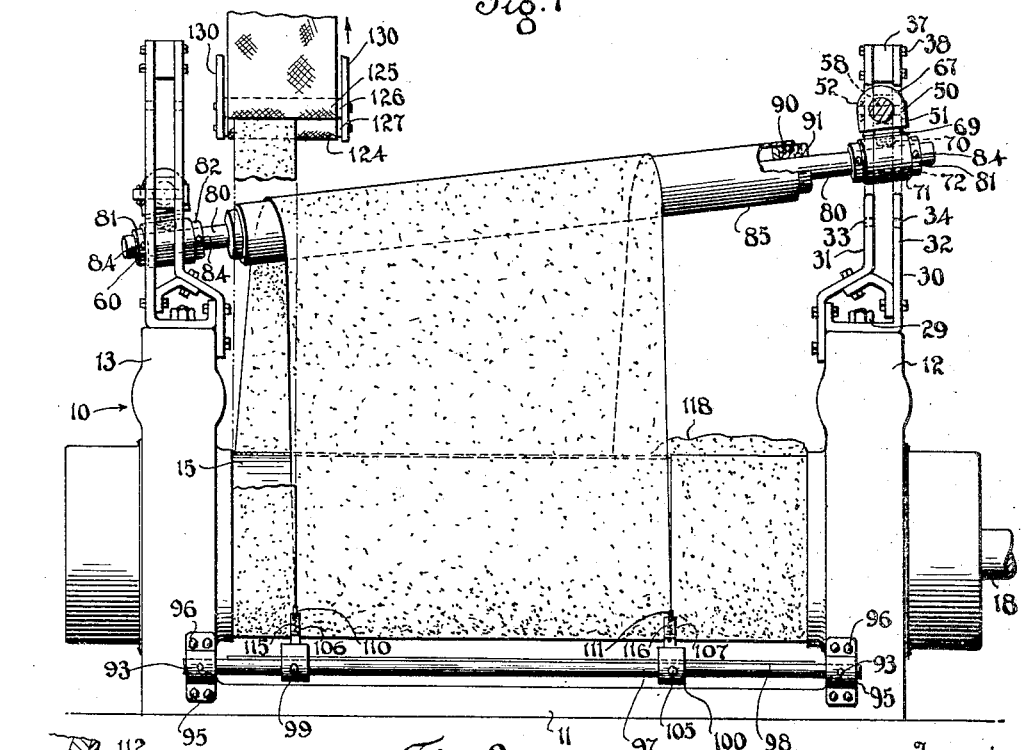
Fig. 2 is a front elevational view of the construction disclosed by Fig. 1.

Referring particularly to Fig. 2, a bracket 30 secured by bolts 29 to the upper surface of the end plate 12 at one end thereof is composed of a pair of vertically projecting spaced bars 31 and 32. These bars are provided with vertically spaced aligned openings 33 and 34 respectively. At their upper ends, the bars 31 and 32 are spaced by a block 37 secured therebetween by bolts 38 projecting through the bars and the block. A like bracket 40 is secured to the upper surface of the end plate 12 at the end thereof opposite that to which the bracket 30 is secured. This bracket is provided with vertically projecting spaced bars 41 and 42 having vertically spaced aligned openings similar to the openings 33 and 34 in the bars 31 and 32. The upper ends of the bars 41 and 42 are separated by a block 43 connected thereto by bolts 44.

As best shown by Fig. 1, a cylindrical bar 55 having reduced ends 56 and 57 of rectangular cross-section extends between the brackets 30 and 40 between the bars 31—32 and 41—42 respectively. The reduced ends 56 and 57 are provided with openings 58 extending therethrough which receive pins 50 projecting through the openings 33 and 34 in the bars 31—32 and 41—42 of the brackets 30 and 40 respectively. Each of these pins is retained in the openings by an integral head 51 at one end and by a cotter pin 52 at the other end. It is evident from this description that the cylindrical bars 55 may be adjusted vertically of the brackets 30 and 40 by selectively positioning the pins 50 in the openings 33 and 34.

The end plate 13 of the machine 10 likewise is provided with brackets 60 and 61 identical with the brackets 30 and 40, which adjustably support a cylindrical bar 65, identical with the bar 55. On each of the bars 55 and 65, a bearing 67 is secured adjustably by a set screw 68 projecting through the bearing and abutting the bar. The lower face of this bearing is flat, as indicated at 69 and is provided with a relatively large screw threaded stud 70 projecting downwardly therefrom. This stud is threaded into a second bearing 71 having an opening 72 therein extending transversely with respect to the stud 70. The bearings 71 on the bars 55 and 65 support a rotatable shaft 80 which is retained therein by collars 81 and 82, disposed on opposite sides thereof. The collars are secured to the shaft by set screws 84 thereby preventing longitudinal movement of the shaft relative to the bearings.

Figure 3:
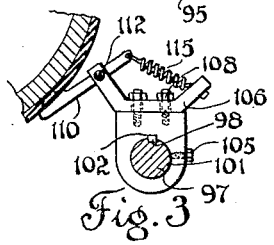
Fig. 3 is a cross-sectional view taken substantially along the line III—III of Fig. 2.

Between the bearings, a cylindrical roller 85 is mounted concentrically upon the shaft 80 by means of rollers bearings 90. Adjacent each end of the roller 85, the bearings 90 are secured against axial movement by collars 91 rigidly secured upon the shaft 80. Each of the end plates 12 and 13, on its front vertically extending face adjacent the lower end thereof, has a bracket 95 secured thereto by bolts 96. A cylindrical rod 97 has its ends disposed in the brackets but normally it is retained stationary by set screws 93 projecting through a portion of the brackets and abutting the rod. A key 98 extends longitudinally of the rod 97 substantially throughout its length. As best shown by Figs. 2 and 3, blocks 99 and 100 having central openings 101 receiving the rod 97 and a slot 102 receiving the key 98, are slidably mounted on the rod but normally are retained thereon in stationary spaced relation by set screws 105. The blocks 99 and 100 are provided with horizontal upper surfaces, upon which substantially U-shape brackets 106 and 107 respectively are secured by bolts 108 projecting through the base of the brackets and engaging the blocks 99 and 100. The legs of the brackets 106 and 107 disposed adjacent the roller 15 have knives 110 and 11 respectively pivoted thereto intermediate their ends by pins 112.

The ends of the knives 110 and 111 projecting toward the roller 15 are sharpened for cutting through rubber stock on the latter, whereas the opposite ends of the knives are connected to the other legs of the U-shape brackets by springs 115 and 116. It is apparent from this description that the knives may be spaced various distances and may be moved longitudinally of the rod 97 by adjustment of the blocks 99 and 100 on the latter.

In operation of the mechanism so far described, rubber, indicated at 118, is disposed between the upper surfaces of the mixing rollers 15 and 16 at the end thereof adjacent the knife 111 and is drawn between such surfaces by the opposite rotary movements of the rollers. As it is drawn between such surfaces, it is squeezed longitudinally thereof and a portion of the rubber is projected across the path of the knife 111 thereby forming a strip of rubber on the side of the latter adjacent the knife 110. An operator severs at one point the strip of rubber thus formed between the knives 111 and 110 and thereafter leads this strip over the roller 85 disposed above the roller 15. The end of the strip then is directed downwardly between the rollers 15 and 16 after which a strip of rubber continuously is conducted over the roller 85 and returned to the roller 15. Owing to the fact that each particle of rubber is advanced longitudinally of the roller by its movement over the roller 85, the rubber automatically is advanced longitudinally of the roller 15 until a strip the width of the distance between the knives 110 and 111 is conducted over the roller 85. The space on the roller 15 between the knife 110 and the end of the roller adjacent thereto is coated with rubber by reason of the advance of that portion of the rubber adjacent the knife moving over the roller 85.

An operator severs this coating of rubber between the knife 110 and the adjacent end of the roller 15, and thereafter conducts the strip thus formed between adjacent reaches of a pair of conveyor belts 124 and 125. These belts are trained over rollers 126 and 127 rotatably mounted in brackets 130. The conveyor belts move the strip to a calendering machine (not shown) and the strip is continuously fed between the rollers of the calendering machine by any suitable means. If desirable, a portion of the conveyor adjacent the calendering machine may be oscillated in order that the strip may uniformly be conducted to the entire surfaces of the rolls thereof.

Figs. 4, 5 and 6 illustrate an apparatus similar to that shown by Figs. 1 and 2 with the exception that power means are employed for operating the auxiliary roller 85. Instead of adjustably securing the bar 55 between the pairs of upright frame members 31—32 and 41—42 by pins 50, the bar at opposite ends is operatively secured to fluid cylinders 150 and 151. These cylinders are secured the front and rear faces respectively of the end plates 12 by means of bolts 152. A piston rod 154 having a piston 155 disposed within the cylinder 150, projects through the upper end of the cylinder and at its upper end is pivoted to one end of the bar 55 by means of a pin 157. Conduits 158 and 159 connected to the upper and lower ends respectively of the cylinder 150 are adapted to supply and discharge fluid from the ends of the cylinder.

The cylinder 151 (Fig. 5) is identical with the cylinder 150 and is provided with a piston rod 160, which at its upper end is pivoted to the opposite end of the bar 55 by means of a pin 162. Conduits 163 and 164 connected to the upper and lower ends of the cylinder 151 are connected respectively with the conduits 158 and 159 by means of other conduits 165 and 166. The conduits 163 and 165 in turn are jointly connected to a conduit 168. Also, the conduits 164 and 166 are jointly connected to another conduit 169.

A cylinder 175 having integral flanges 179 is secured to the frame bar 42 by means of bolts 180. One end of the piston rod 183 extending into the cylinder 175 is secured to a piston 182, while the other end thereof has a pivotal connection 186 to a sectional rod 188 that has at its other end a universal connection 189 to the bearing block 67. A universal joint 187 is provided intermediate the sectional rod 188. Conduits 194 and 195 connected to the inner and outer ends respectively of the cylinder 175 also are connected respectively to the conduits 166 and 165.

Fig. 6 illustrates the fluid operated devices for operating the bar 65 and the bearing 67 thereon, at the opposite end of the apparatus. Inasmuch as the devices are practically identical with those described with reference to Figs. 4 and 5, a detailed explanation is unnecessary. The cylinders for moving the bar 65 vertically are indicated at 200 and 201 respectively, and are secured on the front and rear faces of the end plate 13. The cylinder for moving the bearing 67 along the bar 65 is indicated at 202 and is secured to one of the frame bars projecting upwardly from the bracket 61. The upper and lower ends of the cylinder 200 respectively are connected to conduits 203 and 204, which in turn are connected to conduits 205 and 206. Conduits 207 and 208, also connected respectively to the conduits 205 and 206, in turn are connected to the upper and lower ends of the cylinder 201. The inner and outer ends of the cylinder 202 are connected respectively by conduits 209 and 210 to the conduits 206 and 205. The conduits 168 and 169 referred to in conjunction with Fig. 5 communicate respectively with the conduits 206 and 205.

The conduits 205 and 206 are connected by conduits 215 and 216 to a valve mechanism indicated at 217. As best shown by Figs. 6 and 10, this valve mechanism is operated by a motor 220 provided with a pulley 221 on its shaft about which a belt 222 is trained. The belt also is trained about a pulley 223 secured to a shaft 224 forming part of a reduction gearing 225. A second shaft 226 projecting from the reduction gearing and operated thereby is provided with a crank arm 227 (Fig. 10) which, at its free end, has a pin 228 projecting therefrom. This pin is disposed within an elongate slot 230 formed in the upper end of an arm 231 which is pivoted at its lower end, as indicated at 232, to a stationary bracket 234. At its upper end beyond the slot 230, the bar 231 is provided with a gravity actuated pawl 235 which is pivoted thereto as indicated at 236 and engages teeth 238 of a ratchet wheel 239. The ratchet wheel is rigidly secured to a shaft 240 which is journaled as indicated at 241 and 242 in opposite side walls 243 and 244 of a housing 245 forming part of the valve mechanism 217.

The valve housing 245 is provided with an upper wall 246 and parallel interior walls 247 and 248. Webs 250, 251 and 252 extending between the walls 246 and 247 in spaced relation effect a plurality of chambers 255, 256, 257 and 258 between the walls 246 and 247 of the housing. Other webs 260, 261 and 262 effect a plurality of chambers 265, 266, 267 and 268 between the walls 247 and 248. Between the chambers 255—265, 256—266, 257—267 and 258—268, the wall 247 is provided respectively with conically faced openings 275, 276, 277 and 278, the conical faces of which provide seats for valves 280, 281, 282 and 283. The valves are provided respectively with stems 290, 291, 292 and 293 which project through openings in the wall 248.

Each of the stems is urged downwardly normally by means of a spring 295 which abuts at its upper end a packing nut 296 surrounding the stem and threaded into the wall 248, and at its lower ends a disc 297 secured to the stem. The lower end of the valve stems 290, 291, 292 and 293 are bifurcated and between the bifurcated ends rollers 300 301, 302 and 303 are journaled. These rollers are adapted to coact respectively with cams 305, 306, 307 and 308 integral with the shaft 240. Each cam is semi-circular in shape, as shown best by Figs. 8 and 9, and the cams 305 and 308 are positioned diametrically opposite as compared to the cams 306 and 307.

The chambers 265 and 267 are connected by conduits 310 and 311 respectively to a fluid supply conduit 312 (Fig. 7). The chambers 266 and 268 are connected by conduits 314 and 315 to a discharge conduit 316. The lower end of the conduit 216, which communicates with certain ends of the fluid cylinders on the apparatus, is connected to both of the chambers 255 and 256 by means of conduits 320 and 321 respectively. Likewise the conduit 217 which communicates with other ends of the fluid cylinders is connected by conduits 322 and 323 to the chambers 257 and 258.

A suitable brake mechanism indicated generally at 325 is provided on the end of the shaft 240 projecting from the wall 244 of the valve casing in order to dampen the periodic movement of the shaft 240 effected by the pawl 235 and the ratchet wheel 239.

Assuming that the valves are in positions shown in Fig. 7, it is apparent that the admission valve 282 and the discharge valve 281 are open. At the same time, the valves 280 and 283 are closed. This relation of parts results in admission of fluid under pressure into the conduit 215 and likewise permits fluid to discharge from the conduit 216. Fluid under pressure flowing through the conduit 215 flows into the conduit 205 and thence to the upper ends of the cylinders 200 and 201 and the outer end of the cylinder 202. Also, fluid flows from the conduit 205 through the conduit 169, into the conduits 164, 166 and 194, and thence respectively into the lower ends of the cylinders 151 and 150, and into the inner end of the cylinder 175 respectively.

This admission of fluid under pressure to the upper ends of the cylinders 200 and 201 and into the outer end of the cylinder 202 results in downward movement of the pistons in the cylinders 200 and 201 and inward movement of the piston in the cylinder 202. This movement of the pistons in the cylinders 200, 201 and 202 causes a downward movement of the bar 65 and an inward movement of the bearing 67 on such bar which results in the bearing 67 being positioned adjacent the frame bracket 60 and the bar being positioned at the lower ends of the frame bars extending vertically from the brackets 60 and 61. Fluid in the lower ends of the cylinders 200 and 201 discharges through the conduits 204 and 208 respectively into the conduit 206, thence into the conduit 216, through the conduit 321 to the chamber 256, thence through the valve opening 276 and into the chamber 266 from which it passes into the discharge conduit 314. Likewise, the fluid in the inner end of the cylinder 202 discharges through the conduit 209 into the conduit 206 and finally through the discharge conduit 314.

Simultaneously, the admission of fluid into the lower ends of the cylinders 150 and 151 and the inner end of the cylinder 175 results in upward movement of the pistons in the cylinders 150 and 151 and an outward movement of the piston in the cylinder 175. This effects an upward movement of the bar 55 to its upper position and an outward movement of the bearing 67 on such bar until the bearing is positioned centrally of the latter. Fluid in the upper ends of the cylinders 150 and 151 and in the outer end of the cylinder 175 simultaneously discharges through the conduit 168 into the conduit 206 and thence through the discharge conduit 314 in the manner previously described with respect to the discharge of fluid from the lower ends of the cylinders 200 and 201.

When the cams 306 and 307 are so moved that the valves 281 and 282 close, the cams 305 and 308 simultaneously open the valves 280 and 283 and fluid under pressure then flows through the conduit 310, through the chamber 265, through the opening 275 exposed by the opening in the valve 280, through the chamber 255 and through the conduit 320 into the conduit 216. From this conduit, the fluid flows into the conduit 206 thereby admitting fluid to the lower ends of the cylinders 200 and 201. Simultaneously fluid flows from the conduit 206 through the conduit 209 into the inner end of the cylinder 202. The pressure of the fluid in the cylinders results in an upward movement of the pistons in the cylinders 200 and 201 and an outward movement of the piston in the cylinder 202. In turn, this effects an upward movement of the bar 65 and an outward movement of the bearing 67 until the latter is centrally positioned thereon. Fluid from the opposite ends of these cylinders then is discharged through the conduit 205 into the conduit 215, from which it flows through the conduit 323 and into the chamber 258 of the valve. Then the fluid flows through the opening 278 exposed by the opening of the valve 283 and then into the chamber 268 and through the discharge conduit 315.

Fluid under pressure flowing through the conduit 216 also flows through the conduit 168 and into the upper ends of the cylinders 150 and 151 and into the outer end of the cylinder 175. The action of the fluid in the upper ends of the cylinders 150 and 151 and in the outer end of the cylinder 175 effects a downward movement of the pistons in the former cylinders and an inward movement of the pistons in the cylinder 175. In turn, this movement of the pistons results in a downward movement of the bar 55 and an inward movement of the bearing 67 until it is positioned adjacent the frame bracket 32. Simultaneously, fluid in the other ends of these cylinders is permitted to discharge through the conduit 169 into the conduit 205 and thence to the conduit 215 from which it is discharged through the conduit 315.

It is apparent from this description that when the valves 281 and 282 are open and the valves 280 and 283 are closed, the rods 55 and 65 and the bearings 67 supporting the roller 85 occupy the positions illustrated by Figs. 4, 5 and 6. When the valves 281 and 282 are closed and the valves 280 and 283 open, the bars 55 and 65 are disposed in positions reversely to those shown by Figs. 4, 5 and 6 and likewise the bearings 67 on the bars 55 and 65 located in reversed positions. Periodically then, depending upon the positions of the valves, the roller 85 is located during a predetermined interval in one inclined position and then during a succeeding interval in an oppositely inclined position.

A strip of rubber conducted over the roller 85 in the manner previously described then may be transferred during one interval of time longitudinally of the rollers 15 and 16 in one direction, and then during a succeeding interval, owing to the reversed position of the roller 85, the strip will be so directed that the rubber will be transferred longitudinally of the rollers 15 and 16 in an opposite direction. By reason of this construction, rubber and chemical compounds may be transferred automatically and at predetermined intervals longitudinally of the milling rolls first in one direction and then in the other, thereby effecting a thorough mixing of the rubber and the compounding ingredients. Such an apparatus also may be employed for warming rubber compounds prior to removing a strip therefrom in endless form and conducting it upon a conveying apparatus to a calendering machine. If the apparatus is to be employed for the latter purpose, preferably the automatic timing device is not operated and the inclined roller above the machine is allowed to remain stationary in whatever position found most desirable. If a continuous strip of material is to be removed from the machine, it is apparent that this may be done easily in the manner suggested in the description of the construction illustrated by Figs. 1 and 2.

From the above description, it is apparent that this invention has provided a means and a method for treating rubber, by reason of which rubber may be manually fed between the rollers of a rubber treating machine at one end of the rollers, and progressively conducted to the other end of the rollers and then conveyed in continuous strip form to a calendering machine. Also, according to the invention, raw rubber may be automatically mixed with compounding ingredients, or compounded rubber automatically treated by alternately transferring the rubber from one end of the milling rollers to the other ends thereof. Moreover, the rubber so treated, may then be removed in continuous strip form, to a calendering machine, in the manner previously described. Thus, the invention obviates the manual severance of strips of rubber from rubber treating rollers and the subsequent returning of such strips to the rollers for additional treatment. It is apparent that an apparatus and method of the character described greatly facilitates treatment of the rubber and thus reduces considerably the expense of manufacturing operation. Also, the rubber is more uniformly treated which is highly desirable in order to secure the greatest benefits therefrom.

Although I have illustrated only the preferred forms of the invention and have described those forms in detail, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. The combination with a machine for treating plastic material, including rollers upon which the material normally is disposed, of rotary means spaced from and disposed at an acute angle with respect to the axis of either of the rollers and over which a strip of the material from the rollers is looped, and means for adjusting the rotary means both vertically and horizontally to vary its angle with respect to said rollers.

2. The combination with a machine for treating plastic material comprising substantially contacting cylindrical surfaces, one of which at least is rotatable, of means for automatically transferring the material axially of the cylindrical surfaces, and means for conveying a continuous strip of the material from one of such surfaces at the end thereof toward which the material is transferred.

3. A machine for treating plastic material comprising, in combination, a driven roller upon which the material normally is disposed, curviform means cooperating with said driven roller, a curviform member spaced from said roller over which a strip of the material is looped, and automatic means for shifting said curviform member to different acutely angled positions with respect to the axis of said driven roller.

4. The combination with a machine for treating plastic material including rollers upon which the material normally is disposed, of an elongate member spaced from said rollers over which a strip of the material is looped and automatic means for inclining the member first in one direction and then in an opposite direction, with respect to said rollers.

5. The combination with a machine for treating plastic material including a plurality of rollers at least one of which is a driven roller upon which the material normally is disposed, of a member spaced from the driven roller and over which a strip of the material is looped, and automatic means for inclining the member first in one direction and then in an opposite direction with respect to the driven roller.

6. The combination with a machine for treating plastic material including a driven roller upon which the material normally is disposed, and means cooperating therewith disposed in proximity to the driven roller, of a member spaced from the roller and over which a strip of the material is looped, and automatic means including a timing device for shifting the member to different acutely angled positions with respect to the axis of either of the rollers.

7. The combination with a machine for treating plastic material including a plurality of rollers upon which the material normally is disposed, of a member spaced from the rollers and over which a strip of the material is looped, and automatic means including fluid operated devices for shifting the member to different acutely angled positions with respect to the axis of either of the rollers.

8. A method of treating plastic material which comprises feeding the material between cylindrical relatively rotatable surfaces, conducting a continuous strip of the material in loop form from one of such surfaces and returning it to one of such surfaces at a point longitudinally spaced with respect to the point from which it was removed, and thereafter removing the material in continuous strip form.

9. A method of treating plastic material which comprises feeding the material between cylindrical relatively rotatable surfaces, manipulating a continuous strip of the material in spiralled loop form from one of such surfaces and returning it to one of such surfaces at points longitudinally spaced with respect to the point from which it was removed, and alternating the direction of the spiral to reverse the direction of movement of the material.

10. A method of treating plastic material which comprises feeding the material between cylindrical, relatively rotatable surfaces, and manipulating a continuous strip of the material in spirally looped form to engage one of such surfaces at intervals.

11. A machine for treating plastic material comprising driven means adapted to move in a predetermined path; cooperating means adapted to coact with said driven means in treating said plastic material; and a supporting member normally spaced from and obliquely disposed in relation to said driven means and said cooperating means, said supporting member serving to displace part of said plastic material with respect to said driven means and said cooperating means.

12. The combination with a machine for treating plastic material, including a plurality of rollers upon which the material normally is disposed, of rotary means spaced from and acutely angled with respect to the axis of any of the rollers, over which rotary means a strip of the material from the rollers is looped.

In witness whereof, I have hereunto signed my name.

Signed at Akron, in the county of Summit and State of Ohio, U. S. A., this 31st day of July, 1929.

ROBERT W. SNYDER.